United States Patent [19]

Gabrielson et al.

[11] Patent Number: 5,216,876
[45] Date of Patent: Jun. 8, 1993

[54] METHOD FOR REDUCING NITROGEN OXIDE EMISSIONS FROM GAS TURBINES

[75] Inventors: James E. Gabrielson, Hennepin County, Minn.; Bernard P. Breen, Allegheny County, Pa.

[73] Assignee: Consolidated Natural Gas Service Company, Inc., Pittsburgh, Pa.

[21] Appl. No.: 609,902

[22] Filed: Nov. 5, 1990

[51] Int. Cl.⁵ .......................... F02C 7/26; F02G 3/00
[52] U.S. Cl. .................. 60/39.02; 60/39.06; 60/737
[58] Field of Search ............... 60/39.02, 39.06, 734, 60/737, 740, 746

[56] References Cited

U.S. PATENT DOCUMENTS

| | | | |
|---|---|---|---|
| 2,671,314 | 3/1954 | Lichty | 60/737 |
| 3,792,581 | 2/1974 | Handa | 60/39.02 |
| 3,973,390 | 8/1976 | Jeroszko | 60/737 |
| 4,366,668 | 1/1983 | Madgavkar | 60/39.06 |
| 4,498,288 | 2/1985 | Vogt | 60/39.06 |
| 4,597,342 | 7/1986 | Green | 110/347 |
| 4,610,135 | 9/1986 | Alexander | 60/737 |
| 4,677,829 | 7/1987 | Archer et al. | 60/39.02 |
| 4,779,545 | 10/1988 | Breen et al. | 110/212 |
| 4,790,743 | 12/1988 | Leikert et al. | 431/8 |

FOREIGN PATENT DOCUMENTS 3233832  3/1984  Fed. Rep. of Germany.
1224778  3/1971  United Kingdom.

OTHER PUBLICATIONS

Carlstrom, "Improved Emissions Performance in Today's Combustion System", Jun., 1978, pp. 1-19.
European Published Patent Application No. 280568A (Aug. 31, 1988) Masai.

Primary Examiner—Richard A. Bertsch
Assistant Examiner—Howard R. Richman
Attorney, Agent, or Firm—Buchanan Ingersoll; Lynn J. Alstadt

[57] ABSTRACT

A combustible fuel containing 3% to 45% of the fuel needed to operate a gas turbine is introduced into the compressor air stream for the gas turbine. The mixed fuel and air stream is introduced to the gas turbine prior to the combustor stage through a pipe, orifice or nozzle. The mixed air and fuel stream serves to reduce the nitrogen oxide emissions of the gas turbine. Waste air streams such as mine ventilation air may be used as the mixed fuel and air stream.

20 Claims, 1 Drawing Sheet

METHOD FOR REDUCING NITROGEN OXIDE EMISSIONS FROM GAS TURBINES

BACKGROUND OF THE INVENTION

1. Field of the Invention

The present invention relates to an apparatus and method for reducing the nitrogen oxide emissions from ga turbines. More specifically, it relates to the introduction of gaseous fuel to the intake air utilized in a gas turbine.

2. Description of the Prior Art

In the combustion of fuels in gas turbines, oxygen from the air may combine with nitrogen from the air to form nitrogen oxides. This reaction occurs to a greater extent at higher operating temperatures. Additionally, some oils that are fired in gas turbines have fixed nitrogen, a part of which generally reacts with oxygen from the air to form nitrogen oxide. This reaction occurs even at relatively low combustion temperatures.

Production of this nitrogen oxide is generally regarded as undesirable. There are numerous government regulations which limit the amount of nitrogen oxide which may be emitted into the atmosphere from a gas turbine. Furthermore, the rapid cooling of the combustion products from a gas turbine causes much of the nitric oxide (NO) to be oxidized to nitrogen dioxide ($NO_2$). Consequently, there is a need for apparatus and processes which reduce the nitrogen oxide emissions from gas turbines.

A gas turbine is designed to burn oil, natural gas or other fuels. The fuel is mixed with air in a combustor can. As the air and fuel enter the combustion area, combustion occurs in a flame zone where the temperature is normally well above 3000° F. The combustion products are cooled to around 2000° F. by mixing with excess air which enters through a register. The combustion products, diluted with excess air, exit the can and go through duct work to an expansion turbine where they drive turbine blades. These blades turn a shaft which in turn drives a compressor and a generator. After the power turbine extracts as much energy as possible from the combustion products, they are exhausted to the atmosphere through a stack.

During the combustion of the fuel and air at very high temperatures, some of the oxygen and nitrogen from the air combine to form nitrogen oxide. In addition, a large fraction of fixed nitrogen, which is present in petroleum, coal, and some other fuels, combines with oxygen from the air to form nitrogen oxide.

Numerous attempts have been made to develop devices and processes which reduce the nitrogen oxide emissions from these gas turbines. One such approach is the injection of water into the flame zone in order to reduce the peak flame temperatures and thus reduce the formation of nitrogen oxide. This process has had some technical and commercial success, but it suffers from at least three disadvantages. First, the water injection reduces the efficiency of the process, making it necessary to burn more fuel to obtain the same amount of electrical power. Second, the water contains suspended and dissolved solids, such that even with relatively clean water, particulate emissions are increased. These particulate emissions may also be considered undesirable. Third, the water injection may increase the carbon monoxide emissions.

Other proposed modifications include changes to the combustor can in order to reduce $NO_x$ emissions. These changes are intended to add air to the combustor can in greater than stoichiometric quantities, so that combustion occurs at a lower temperature. In diffusion flames, combustion occurs at stoichiometric mixtures. The flame temperature is therefore maximized even though the quantity of air surrounding the combustion is large enough to dilute the flame, causing it to burn at a lower temperature. Excess air mixes with the combustion products at a very high temperature and a portion of the oxygen contained therein reacts to form NO.

In gas turbines, the combustion air or working fluid is compressed to very high pressures which causes the temperature to become very high. Fuel is introduced simultaneously with the hot, compressed air into the combustor can. The fuel burns in the air, raising the temperature and volume further. The combustion products are then introduced into the power turbine where they can expand. Generally, a great excess of air flowing around the combustor can is used to limit the peak temperature. Holes in the can allow some air to enter around the periphery of the can to provide further cooling. This air is sometimes induced to flow as a film on the inside perimeter of the can. Other air flows along the outside of the can. Both air flows cool the can and in turn become heated. This air then enters the burner as very high temperature combustion air. Various improvements with alternative holes cut in the can have been tried, but have met with only limited success.

Burner modifications have also met with limited success. Since each can has only one burner, it is not possible to run the burners in a non-stoichiometric mode. Although each gas turbine may have several combustor cans, each can must have an excess of air to cool it properly. It is thus not possible to operate some cans in a fuel rich mode and others in an air rich mode, and then mix the products to complete the combustion and produce the desired temperature for the turbine.

Some of these approaches have been successfully utilized on boilers, but are not practical in gas turbines. Other techniques for reducing $NO_x$ emissions, such as reduced air preheat, increased primary furnace size, flue gas recirculation, improved heat transfer, in-furnace $NO_x$ reduction, and thermal $DeNO_x$ processes, which have been found to be effective in furnaces are also not practical in gas turbines.

There is, therefore, a need for a method and apparatus to reduce $NO_x$ emissions from gas turbines.

SUMMARY OF INVENTION

To reduce the nitrogen oxide emissions in gas turbine flue gas, we introduce a combustible gas or volatile hydrocarbon such as natural gas, butane, hexane, ethanol, hydrogen or mixtures of these and other combustible compounds into the combustion air of a gas turbine. The fuel may be mixed with air in a plurality of locations, including: prior to the air entering the compressor; between the stages of the compressor and subsequent to the air compression stage. The fuel and air should be mixed rapidly so as to maintain only a small volume of explosive mixture. Rapid mixing also keeps the size of the explosive volume small. The fuel is not explosive in the absence of air and we prefer that the final concentration be maintained below the lower explosive limit. Furthermore, fuels which have little or no fixed nitrogen are preferred.

The simplicity of the process makes it useful for both new gas turbines and retrofitting of existing gas turbines. The system relies on an air and fuel mixture for $NO_x$ control, so that there is no need for the fuel consuming step of water injection. The low temperature at which this process takes place further serves to reduce the equilibrium level of nitrogen oxide in the flue gas, and hence increases the nitrogen oxide reduction possible. Moreover, expensive water treatment and high pressure water pumps are not required.

These and other advantages and features of the present invention will be more fully understood with reference to the presently preferred embodiments thereof and to the appended drawings.

DESCRIPTION OF THE PREFERRED EMBODIMENTS

Figure 1:
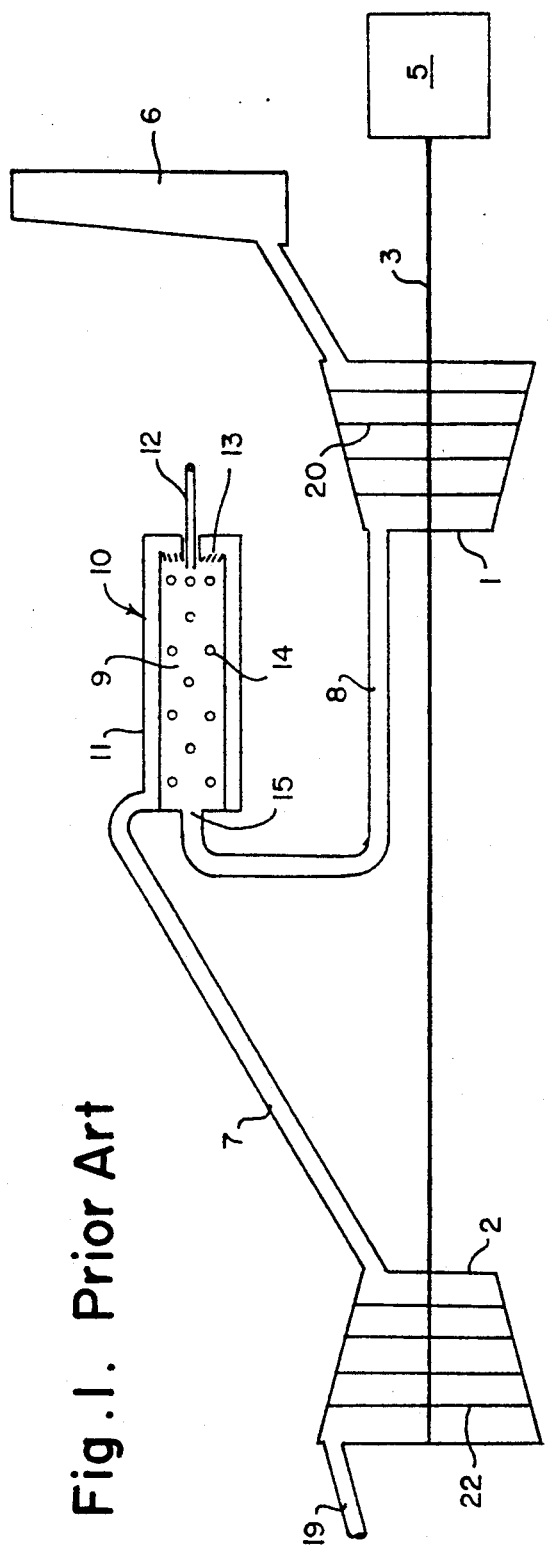
FIG. 1 is a diagrammatic view of a prior art gas turbine.

Our improved method for reducing nitrogen oxide emissions in gas turbine exhaust gas may be applied to a prior art gas turbine of the type illustrated in FIG. 1. The gas turbine is generally comprised of a compressor 2, a combustor can 9 and an expansion turbine 1. Oil, natural gas or other fuel enters the burner 10 through pipe 12 which may have nozzles and orifices (not shown). The fuel reacts with air which enters the combustor can 9 through registers or vanes 13 surrounding the fuel entry apparatus. As the air and fuel enter the combustor can 9 they mix and burn. Combustion occurs in a flame zone where the temperature is well above 3000° F. The combustion products are cooled to around 2000° F. by mixing with excess air which enters through the register 13 and by mixing with air which enters through the cooling holes 14. The combustion products, diluted with excess air exit the can through the end 15 and go through duct work 8 to the expansion turbine 1 where they drive turbine blades 20. These blades turn a common shaft 3 which drives the compressor 2 and a generator 5. After the power turbine extracts as much energy as possible from the combustion products, they are exhausted to the atmosphere through a stack 6.

Air is introduced into the compressor 2 by way of an air intake 19. The air is compressed by the blades 22 in the compressor 2 and progresses through duct work 7 to the combustor can shroud 11 and into the combustor can 9. Part of the air enters by way of the air register 13, and the remainder by way of the cooling holes 14. In the combustor can 9 the air combines with the fuel and burns. The combustion products proceed with excess air, as described above, to the stack 6.

During the combustion of the fuel and air at very high temperatures, some of the oxygen and nitrogen from the air combine to form nitrogen oxide. In addition, a fraction of fixed nitrogen, present in petroleum, coal, and some other fuels, combines with oxygen from the air to form nitrogen oxide.

Figure 2:
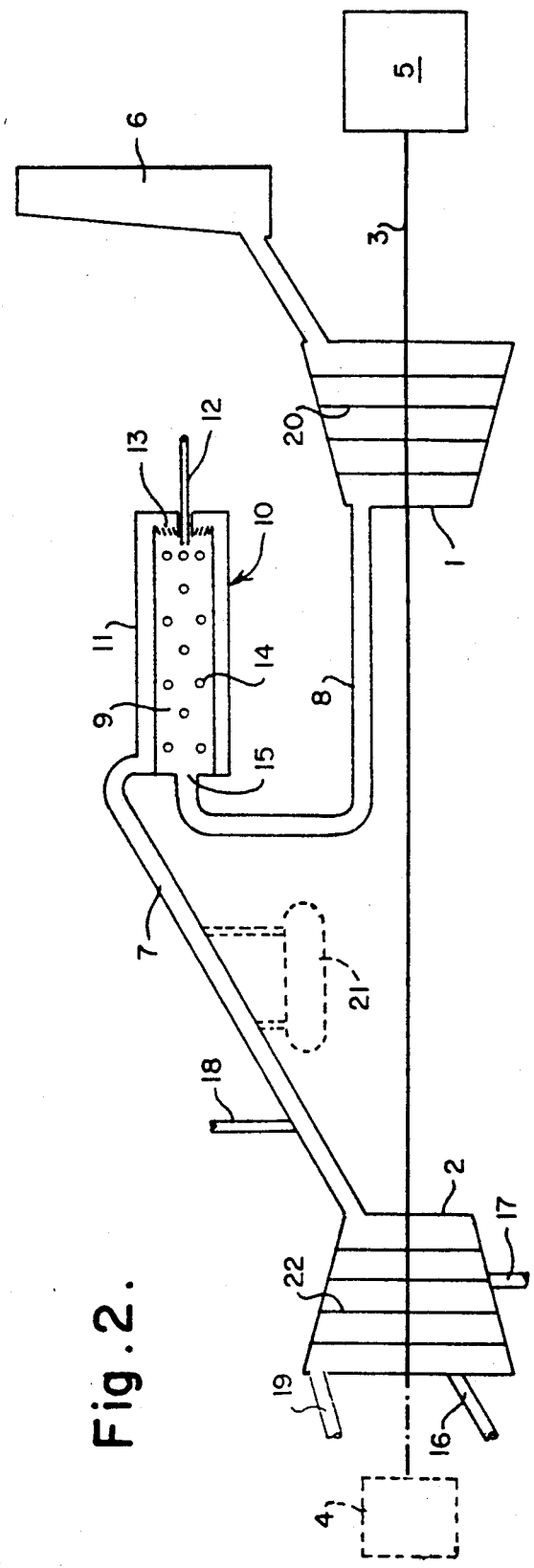
FIG. 2 is a diagrammatic view of a gas turbine utilizing our $NO_x$ reduction system.

Our improved gas turbine is shown in FIG. 2. Like numbers are used to identify like components. As in the prior art, the basic parts of our improved gas turbine are compressor 2 having blades 22, combustor can 9 with shroud 11, expansion turbine 1 with blades 20 and generator 5. In our improved gas turbine, we provide a fuel addition apparatus in at least one of a plurality of possible positions. These devices are connected to a fuel source (not shown) from which they deliver the fuel through pipes, which may have nozzles, orifices, or for liquid fuel, atomizers affixed thereto for the introduction of the fuel to the gas turbine. Such devices are generally shown as pipes 16, 17, or 18, which can be used separately or in any combination to add fuel to the air and thus reduce the nitrogen oxide in the stack 6. We prefer to introduce natural gas or other fuel having little or no fixed nitrogen content. On other fuel we prefer to use is a gas having a lower volumetric energy content than that of natural gas. We prefer to introduce this fuel through more than one pipe 16, 17 or 18 so that part of this fuel is diverted to compressor 2. We may also inject more than one fuel. The additional fuel could be a solvent. The pipes are positioned so that the flow from these injectors mixes with the air before the air and fuel reach the combustor can 9. Other suitable fluid fuels which usually contain little or no fixed nitrogen include those of the general forms $H_2$, $C_xH_y$, $C_xH_yO_z$. One could also use as a fuel source a fuel containing waste air stream from a manufacturing or other process, such as mine or paint booth ventilation air or print drying air. When mine ventilation air is used we prefer to position and configure the turbine so that it will operate to draw the mine ventilation air from the mine.

Our improved gas turbine of FIG. 2 operates in much the same way as the gas turbine in FIG. 1. That is, combustion products diluted with excess air travel from combustor can 9 through duct 8 to drive blades 20 in expansion turbine 4. These blades turn shaft 3 which drives generator 5. Shaft 3 can be extended as shown in FIG. 2 to drive compressor 2 or a separate drive means 4 shown in chainline can be provided to drive that compressor. One may also provide a storage system 21 for storing compressed air before that air enters combustor can 9.

The fuel supplied will generally burn as it enters the combustor can 9 through the cooling holes 14 rather than through the burner. At these locations, combustion will occur at low temperatures, and should be within the range of temperatures which can be tolerated by the metal of the combustor can 9, the duct work 7, 8 and the metal of the turbine blades. These low temperatures, being about 1800° F. to 2200° F., are well below the temperatures where NO is formed rapidly, which are approximately 2900° F. and up. Furthermore, these are temperatures where the NO equilibrium value is very low. Thus the fuel which is introduced with the air will not participate in the production of NO. The fuel which is introduced by our method will provide energy input into the gas turbine at least 0.2% and preferably of between 3% and 45% of the total energy input. That energy input and $NO_x$ reduction are related. For a fuel which is introduced with the air that provides 25% of the total energy of the system, $NO_x$ emissions can be expected to be reduced by approximately 35%.

Additionally, as the fuel burns at these low temperatures, radicals are formed. These radicals, such as $CH_2$, $CH_3$, CH, and CHO react with NO and $O_2$ to form $N_2$, $CO_2$ and $H_2O$. The radicals, which are present in all flames, supply chemical pathways in which the concentration of NO is reduced to its equilibrium value. This concentration is very low for the temperature at which most of the fuel entering with the air is burned. Some of the NO may be converted intermediately to ammonia, cyanide and the like, but these compounds react very rapidly with the remaining NO to form $N_2$. Thus, as these reactions reduce $NO_x$ which was already formed in the primary burner, the $NO_x$ reduction may be above 50% which is greater than that discussed above.

As these fuels, mixed with air, enter the combustor can 9 and begin to burn, they do so at temperatures of about 2000° F. At these low temperatures, very little NO can be formed. In addition, the radicals formed from this mixed fuel react with previously formed $NO_x$ to remove it. These $NO_x$ reduction reactions produce ammonia-like and cyanide-like compounds generally as follows:

$$CH_i + NO_x \rightarrow N_2 + NH_i + H_iCN \quad (1)$$

As these products further mix with combustion products from the burner, the reduced nitrogen forms react with additional NO to form $N_2$:

$$2NH_i + NO \rightarrow N_2 + H_2O \quad (2)$$

$$H_iCN + 2NO \rightarrow N_2 + CO_2 + H_2O \quad (3)$$

It should be noted that these equations characterize the process but do not specifically detail all of the reactions, pathways and intermediate species which may occur.

The fuel and air mixture reduces the amount of nitrogen oxide in the flue gas in three ways. First, the natural gas and many other volatile fuels do not contain any fixed nitrogen. Consequently, unlike a fuel containing fixed nitrogen, the combustion of those fuels creates very little additional nitrogen oxide. Second, the fuel mixed with air burns at a very low temperature, so little nitric oxide is formed from the nitrogen contained in the air. Third, at the temperature where most of the fuel burns, the equilibrium level of nitrogen oxide is lower, allowing for a large reduction in $NO_x$ by reactions (1), (2), and (3) above.

In addition to providing a suitable reduction in the amount of the nitrogen oxide in the stack gas of a new gas turbine, it is possible and cost-effective to retrofit the process to an existing gas turbine.

A further advantage of this process is that in most instances, the primary fuel can be used to make the air and fuel mixture. This eliminates the need to store alternate fuels, e.g., ammonia, which is used in catalytic and thermal De-$NO_x$ processes.

Additionally, when gas having a low or medium energy content, such as landfill gas, is used as the primary fuel, a portion of it may be diverted to the air inlet. This reduces the amount of fuel which must be compressed in its own less efficient compressor and results in energy and capital savings. Consequently, it is desirable to direct as much fuel to the main air compressor as possible.

Naturally occurring or industrial waste air streams having a small amount of natural gas or other fuel in large amounts of air may also be utilized as the mixed air and fuel stream. The use of this material may then result in $NO_x$ reduction, fuel savings, reduction in hydrocarbon emissions and reduction in the greenhouse effect. Examples of such waste air streams which could be used in this manner are coal mine ventilation exhaust air, paint booth exhaust, solvent drying air, air used to dry print produced with inks which have hydrocarbon solvents, low concentration gob gas, and low concentration landfill gas.

While we have described a present preferred embodiment of the invention, it is to be distinctly understood that the invention is not limited thereto, but may be otherwise embodied and practiced within the scope of the following claims.

We claim:

1. A process for reducing nitrogen oxide in exhaust gas from a gas turbine of the type having a compressor section, which receives and compresses an air stream which is directed to a combustor section from which combustion products are then directed to a turbine section; the process comprising the introduction of a combustible gaseous fuel into the air stream as the stream approaches the compressor section while the gas turbine is operating, in order to introduce a mixed gaseous fuel and air stream having excess air to the combustor section.

2. The process as described in claim 1 wherein the fuel comprises a mixture of fuels, the mixture having at least one component selected from the group consisting of hydrogen, natural gas, petroleum products, $C_xH_y$ compounds and $C_xH_yO_z$ compounds.

3. The process as described in claim 1 wherein the fuel is a fuel selected from the group consisting of hydrogen, natural gas, petroleum products, $C_xH_y$ compounds and $C_xH_yO_z$ compounds.

4. The process as described in claim 1 wherein the fuel is introduced in a manner and quantity to provide between 3 and 45% of the total energy input to the gas turbine.

5. The process as described in claim 1 also comprising introducing a second fuel with the combustible gaseous fuel wherein the second fuel is atomized into the combustion air.

6. The process as described in claim 1 also comprising introducing a second fuel with the combustible gaseous fuel wherein the second fuel is a liquid.

7. The process as described in claim 1 wherein the fuel is at least partially comprised of combustibles from a waste gas.

8. The process as described in claim 1 wherein the mixed fuel and air stream is oversaturated with fuel, such that no combustion may take place.

9. The process as described in claim 1 wherein the fuel is landfill gas.

10. The process of claim 1 wherein a portion of the combustible gaseous fuel is injected through at least two of a first input into the air stream as the stream approaches the compressor section, a second input to the air stream at a point between compressor stages and a third input to the air stream after the compressor.

11. A process for reducing nitrogen oxide in exhaust gas form a gas turbine of the type having a compressor section which receives and compresses an air stream which is directed to a combustor section; the process comprising the introduction of a combustible gaseous fuel into the air stream at a point between compressor stages while the gas turbine is operating, in order to introduce a mixed gaseous fuel and air stream having excess air to the combustor section.

12. The process as described in claim 11 wherein the fuel is introduced in a manner and quantity to provide between 3 and 45% of the total energy input to the gas turbine.

13. The process as describe din claim 11 wherein the gas turbine is fueled with gas having a lower volumetric energy content than that of natural gas, a part of this fuel being diverted to the air compressor.

14. A process for reducing nitrogen oxide in exhaust gas from a gas turbine of the type having a compressor section which receives and compresses an air stream which is directed to a combustor section from which combustion products are then directed to a turbine section; the process comprising the introduction of a combustible gaseous fuel int the air stream as the stream approaches compressor section while the gas turbine is operating, in order to introduce a mixed gaseous fuel and air stream having excess air to the combustor section wherein the gas turbine is fueled with gas having a lower volumetric energy content than that of natural gas.

15. The process as described in claim 14 wherein the air is saturated with fuel.

16. A process for reducing nitrogen oxide in exhaust gas from a gas turbine of the type having a compressor section which receives and compresses an air stream which is directed to a combustor section from which combustion products are then directed to a turbine section; the process comprising the introduction of a combustible gaseous fuel into the air stream as the stream approaches the compressor section while the gas turbine is operating, in order to introduce a mixed gaseous fuel and air stream having excess air to the combustor section wherein the fuel comprises a hydrocarbon, the hydrocarbon providing at least 0.2% of the energy needed to fire the gas turbine.

17. The process as described in claim 16 wherein the air and fuel mixture is selected form the group consisting of mine ventilation air, paint booth ventilation air and print drying air.

18. The process as described in claim 16 wherein the air and fuel mixture further comprises at least one solvent.

19. The process as described in claim 16 wherein the compressor draws ventilation air flow from a mine.

20. The process as described in claim 16 wherein the air and fuel mixture further comprises additional fuel added to the air and fuel mixture prior to combustion.

* * * * *